Feb. 12, 1957
C. A. ANDERSON
2,781,228
IRRIGATION CONTROL SYSTEM
Filed June 1, 1953
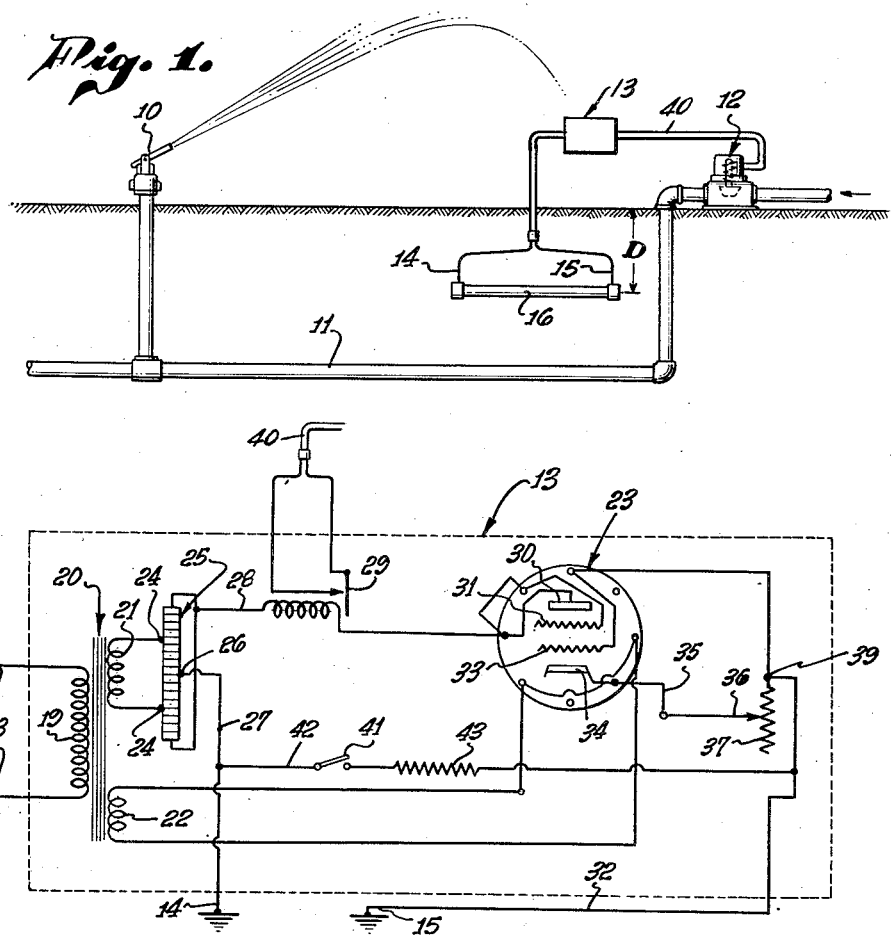
INVENTOR.
CARL A. ANDERSON,
BY
ATTORNEY.

2,781,228
Patented Feb. 12, 1957

2,781,228
IRRIGATION CONTROL SYSTEM

Carl A. Anderson, Lakewood, Calif., assignor to Harry M. Davis, Palmdale, Calif.

Application June 1, 1953, Serial No. 358,929

4 Claims. (Cl. 299—25)

This invention relates to an irrigation control system and more particularly to an improved, automatically actuated irrigation system responsive to moisture content of the soil and actuated when a preselected degree of moisture or lack of moisture exists in the soil.

Generally speaking prior proposed irrigation control systems have included timing means for supplying water at an arbitrary preselected time and for an arbitrary preselected time length or period. The length of time for which water was supplied was generally estimated with the result that the amount of water supplied to a specific area either penetrated too deeply or did not penetrate a sufficient depth. The time at which the irrigation commenced was generally controlled by a clock means.

Such prior irrigation control systems were inefficient in that only a general estimate was made of various conditions affecting the amount of water in the soil and an accurate determination of precisely when irrigation should commence and for what length of time irrigation should continue was impractical to make each day. Conditions affecting the amount of water in the soil include the amount of water evaporated by the sun; the rate of evaporation as affected by wind conditions; the texture of the soil, and various other conditions which change and vary from day to day. Obviously, to accurately evaluate these varying conditions from day to day so as to irrigate at the proper moment and for the most desirable length of time was difficult and required considerable extra effort.

The purpose of this invention is to disclose a simple, effective control system for irrigation of selected areas at the proper time and for a proper length of time so that the soil in such areas is maintained in a most desirable and efficient condition for releasing nutrients in the soil to plants growing therein. The invention contemplates a sensing device or a means which is responsive to a preselected amount of moisture or dampness in the soil for controlling the opening of a valve in a water-supply line. In other words, when the soil becomes relatively dry at a selected depth, the water valve is automatically opened and is not closed until the desired moisture condition exists at said depth.

The primary object of this invention is to disclose and provide an irrigation control system which is effective to maintain soil in a preselected moist condition whch is most favorable for the particular use to which the soil is being used.

An object of this invention is to disclose and provide an irrigation control system wherein a sensing device may be buried to a selected depth for maintaining a minimum condition of moisture at said depth.

Another object of this invention is to disclose and provide an irrigation control system wherein the water-supply valve is normally closed and actuated into open position only when the condition of moisture falls below that for which the sensing device is adjusted.

Another object of this invention is to disclose and provide an irrigation control system utilizing electrical means for determining the moisture condition of the soil wherein the electrical means operates under low voltages not harmful to children and the like.

A further object of this invention is to disclose and provide an irrigation control system inexpensive and easy to manufacture, readily installed and capable of employment under a variety of soil conditions.

Generally speaking this invention contemplates an irrigation control system wherein a solenoid actuated valve is employed in a water line which supplies water to a sprinkler. The solenoid valve is normally closed and is controlled by an electrical means which includes a pair of spaced electrodes which may be buried to a preselected depth so as to measure the ground resistance between the electrodes. The ground resistance is dependent upon the amount of moisture in the soil at said selected depth and when the moisture falls below a preselected amount the solenoid valve is actuated to open position for irrigating the area associated with the sprinkler until a preselected moisture condition exists at the depth of the electrodes.

Other objects and advantages of this invention will be readily apparent from the following description of the drawings in which an exemplary embodiment of this invention is shown.

In the drawings:

Fig. 1 is a diagrammatic view of an irrigation control system embodying this invention.

Fig. 2 is a schematic view of the circuit diagram of the electrical means employed with the control system shown in Fig. 1.

The irrigation control system shown in Fig. 1 includes a sprinkler head 10 connected by well-known pipe means 11 to a suitable water-supply source such as a city water system or a pump and tank system. A solenoid-actuated valve 12 may be included in said pipe means 11 at any suitable point, said solenoid valve being of well-known make and manufacture and being normally closed. Electrical means generally and diagrammatically indicated at 13 may be operably connected to the solenoid valve 12 for actuation thereof under preselected conditions. It is understood that more than one sprinkler head may be associated with this system, all of said sprinkler heads being controlled by the actuation of the solenoid valve 12.

The electrical means 13 may be located in any convenient place adjacent to the area to be irrigated and includes a pair of electrodes 14 and 15 adapted to be buried a selected depth D in the area being irrigated or watered by the sprinkler 10. In the top portion of Fig. 1 the electrodes 14 and 15 are shown as being unconnected to the electrical means 13 whereas in the diagrammatic representation of the electrical means the electrodes 14 and 15 are indicated by the usual electrical symbols for a ground. Preferably the electrodes 14 and 15 are held apart a selected distance by a rod 16 of electrically non-conductive, dielectric material such as Lucite, etc. In the example shown it is contemplated that the length of the rod 16 may be from four to eighteen inches although it is understood that any selected length may be employed so as to permanently space apart the electrodes 14 and 15.

The selected depth D to which the electrodes 14 and 15 are to be buried in the soil is dependent upon the depth to which irrigation is desired. For example, in an area where lawn grass is to be grown and watered, the depth of electrodes 14 and 15 may be about four inches. In the event the irrigation control system is employed with plantings having roots extending deeper into the soil the electrodes may be buried at the said root depth so that a proper minimum moisture condition may be maintained at said depth.

The electrical means 13 may be connected to a suitable electrical power supply source through the feed lines 18, said power supply normally being 110 volts. The power feed 18 is connected to the primary coil 19 of a transformer generally indicated at 20. The secondary side of said transformer includes a first secondary coil 21 having a nontransformed voltage of 110 volts and a second secondary coil 22 having a transformed voltage of approximately 6 volts. The secondary coil 22 is electrically connected to a vacuum tube 23 of well-known make and manufacture for supplying a heating current to the heating element of said tube. The vacuum tube 23 may be of a type commonly identified as 6L6, 6V6, or 6N7.

The untransformed 110 volts on the secondary 21 may be connected as at 24 in well-known manner to the input side of a selenium rectifier means 25. The selenium rectifier means 25 may be of any suitable preselected capacity and while a selenium rectifier is illustrated, it is understood that any suitable rectifier means, such as a copper oxide rectifier or "Tungar" bulb, may be employed for rectifying the alternating current of the 110 volt secondary coil 21 to direct current. The rectifier means 25 is connected at its center point as at 26 to ground by a lead 27 connected to the electrode 14.

The output side of the selenium rectifier is connected to lead 28 which is connected in series to a normally energized relay 29 and to a plate element 30 of the tube 23. A screen grid 31 is connected to the lead 28 in well-known manner.

The other electrode 15 is connected by lead 32 to the control grid 33 of the tube 23. The cathode 34 of the tube is connected by line 35 to a sensitivity control element 36 which is adjustably movable along resistance 37 which is connected at 39 to the lead 32. The cathode 34 is thus controlled so that the electrical means 13 may be responsive to a selected ground resistance existing between electrodes 14 and 15. The ground resistance between electrodes 14 and 15 is dependent upon the moisture condition of the soil at the depth to which the electrodes are buried.

The relay 29 which is connected in series between the tube 23 and the rectifier 25 is normally energized by current flowing between the rectifier, the electrodes and the tube. Under such conditions of energization the relay 29 maintains the solenoid valve 12 in normally closed position through the electrical connection 40.

In operation of the electrical means 13 as long as a selected condition of moisture is present in the soil at the depth to which the electrodes 14 and 15 are buried, the moist soil therebetween will conduct an electrical current to complete the rectifier, tube, relay circuit. When the soil between the electrodes 14 and 15 becomes relatively dry or the degree of moisture drops below that which is desired, the ground resistance between electrodes 14 and 15 increases so that insufficient current is supplied in the circuit to maintain the relay in energized condition. Upon de-energization of the relay the solenoid valve 12 is actuated to open position and water is supplied to the sprinkler 10 for irrigating the area. As soon as the water from the sprinkler 10 has permeated the soil so that a selected moisture condition exists between electrodes 14 and 15 the rectifier, tube, relay circuit will be completed because of flow of current between electrodes 14 and 15, the relay will be energized and the solenoid valve will be actuated to closed position.

Since closure of the solenoid valve 12 is dependent upon the current flow between the electrodes 14 and 15 means for positively assuring that the solenoid valve 12 remains in closed position in the event that the area is being utilized for other purposes may be provided by installing an electrical switch 41 between the terminals 14 and 15. A lead 42 connecting lines 27 and 32 may include a selected resistance 43 so that when switch 41 is closed suitable current flow will be provided in the rectifier, tube, and relay circuit to maintain the relay energized and the solenoid valve 12 closed. The sprinkler 10 may thus be controlled against inadvertent operation which may cause damage and inconvenience to activities in the areas under the control of this irrigation system.

It will thus be readily apparent to those skilled in the art that a very simple, effective irrigation control system has been disclosed hereabove in which the condition of the soil determines whether irrigation is required or not required. The system does not depend upon arbitrarily selected time intervals or arbitrarily set times for commencing irrigation, but depends solely upon the soil condition. Thus, even though the soil condition varies from day to day this irrigation control system is responsive directly to such variations in soil conditions and will provide irrigation in a most efficient and effective manner.

It should be noted that the simple, effective irrigation control system of this invention is one which consists of extremely simple circuitry and is one in which the circuitry is normally operable to maintain the solenoid valve in closed position. In other words, normally there will be current flow in the rectifier, tube, relay circuit while the soil is in a preselected moist condition. The sensitivity of the electrical means to the moisture content of the soil is readily adjusted to a selected value by varying the resistance of the variable resistance 37 by the sensitivity control element 36. It is understood that varying the resistance of the variable resistance 37 will vary the bias on the tube 23 so as to control the tube for controlling the energization of the relay 29. If desired, the variable resistance 37 may be arranged in such a manner that indicia are afforded indicating degrees of moisture content.

It is understood that various modifications and changes may be made in the control system described above, and all such changes and modifications coming within the scope of the appended claims are embraced thereby.

I claim:

1. In an irrigation control system including a water supply line and a normally closed solenoid-actuated valve in said line, the combination of: electrical means including an alternating current power supply; a transformer including a first secondary coil of non-transformed voltage and a second secondary coil of transformed low voltage; an electron discharge tube provided with a heating element electrically connected to the second secondary coil; a rectifier means connected to the first secondary coil and to the anode of said tube; a pair of sensing electrodes adapted to be buried in soil in spaced relation, one electrode being electrically connected to said rectifier means, and the other electrode being connected to the cathode and control grid of said tube; and a relay means in series between the rectifier means and the tube, said relay means being normally energized to maintain the solenoid valve in normally closed position when the moisture content of the soil between the electrodes exceeds a preselected minimum.

2. In a control system as claimed in claim 1 including a variable resistance in series between the said other electrode and the cathode of the tube for regulating the response of the electrical means to a preselected moisture condition of the soil.

3. In an irrigation control system including a water supply line and a normally closed solenoid-actuated valve in said line, the combination of: electrical means controlling actuation of said valve and responsive to moisture content of the soil in the area to be irrigated comprising a rectifier means; an electron discharge tube having its anode connected to the rectifier means; a relay means connected in series between the rectifier means and tube and connected to the valve for controlling actuation thereof; and a pair of spaced electrodes connected respectively to the rectifier means and to the cathode and control grid of the tube; said electrodes being adapted to be buried in soil to be irrigated at a selected depth.

4. In an irrigation control system including a water supply line and a normally closed solenoid actuated valve in said line, the combination of: electrical means controlling actuation of said valve and responsive to moisture content of the soil in the area to be irrigated comprising a direct current voltage supply source; an electron discharge means having its anode connected to one side of the supply source; a relay means connected in series between the supply source and the electron discharge means and connected to the valve for controlling actuation thereof; and a pair of spaced electrodes connected respectively to the other side of the supply source and to the cathode and control grid of the electron discharge means, said electrodes being adapted to be buried in soil to be irrigated at a selected depth.

References Cited in the file of this patent

UNITED STATES PATENTS

| | | |
|---|---|---|
| 1,004,726 | Barney | Oct. 3, 1911 |
| 1,598,238 | Brooks | Aug. 31, 1926 |
| 2,599,862 | Ray | June 10, 1952 |
| 2,611,643 | Higgins | Sept. 23, 1952 |